United States Patent [19]

Smith

[11] Patent Number: 4,851,265

[45] Date of Patent: Jul. 25, 1989

[54] SURFACE MODIFICATION OF POLYMERS TO IMPROVE PAINT ADHESION AND AGENT THEREFOR

[75] Inventor: Bruce R. Smith, Muskegon, Mich.

[73] Assignee: The Dow Chemical Company, Midland, Mich.

[21] Appl. No.: 136,310

[22] Filed: Dec. 22, 1987

[51] Int. Cl.$^4$ ............................................. B05D 3/02
[52] U.S. Cl. ................................... 427/316; 427/322; 525/519
[58] Field of Search ................ 525/519; 427/316, 322

[56] References Cited

U.S. PATENT DOCUMENTS

| | | | |
|---|---|---|---|
| 2,781,331 | 2/1957 | Jones et al. | 260/63 |
| 3,607,536 | 11/1968 | Bragole | 152/272 |
| 4,253,999 | 3/1981 | Okishi | 524/157 |
| 4,442,195 | 4/1984 | Yamamoto et al. | 430/191 |
| 4,567,241 | 1/1986 | Kitchens et al. | 525/352 |
| 4,692,291 | 9/1987 | Angell, Jr. | 264/120 |

OTHER PUBLICATIONS

U.S. Application Serial No. 13,487 Filed 2-11-87.

*Primary Examiner*—Joseph L. Schofer
*Assistant Examiner*—Bernard Lipman
*Attorney, Agent, or Firm*—A. Cooper Ancona

[57] ABSTRACT

The surface of a polymer is treated to improve the adherence of paint, ink and glue thereto by contacting its surface with a solution of an ortho-benzoquinone or it substituted derivative together with an organic carboxyic acid or its anhydride or cyanic or thiocyanic acid in an inert organic solvent.

11 Claims, No Drawings

SURFACE MODIFICATION OF POLYMERS TO IMPROVE PAINT ADHESION AND AGENT THEREFOR

BACKGROUND OF THE INVENTION

Many polymers, which are used for making various articles of manufacture by molding, extruding and the like processes, are difficult to paint, or at least it is difficult to prevent the paint on such articles from cracking or peeling. It is also difficult to get ink to adhere to films of such platics which are used for packaging. Numerous methods have been tried to obtain better paint adherence on such polymeric articles.

It is known that thiocyanogen is an active compound useful for treating the surfaces of polymers to enhance their adhesive properties, e.g. adherence of polymer films to each other or to paint applied to such polymer surfaces. Thiocyanogen is also useful in reacting with organic compounds to prepare organic thiocyanates or isothiocyanates.

The reaction with the polymers or with organic compounds is advantageously conducted in solution since the thiocyanogen is not normally isolable as such. Even in solution, however, the thiocyanogen is not stable and will precipitate from solution as a polymeric material which is unreactive for the purposes desired. Thus, these solutions must be used within a short period of time after preparation or prepared in situ. Processes of thiocyanating surfaces of polymers are described in U.S. Pat. Nos. 2,781,331; 3,607,536 and 4,567,241. Another method of thiocyanating polymer surfaces is disclosed by a different inventor in a copending U.S. patent application (Ser. No. 13,487, filed Feb. 11, 1987) in which the surface is treated with a stabilized thiocyanogen. The disclosure teaches that $(SCN)_2$ in combination with certain $\alpha,\beta$-diketones, such as o-chloranil, forms a stable composition which can be used to obtain the same results as when treating the surface of polyurethanes with the unstabilized thiocyanogen. The method and compositions disclosed therein are incorporated herein by reference.

Current methods in use industrially, however, for promoting adhesion on difficultly paintable polyurethane reaction injection molded (RIM) parts usually involve washing the surface with a multi-stage wash, using acid, e.g. phosphoric acid, and a detergent, but such treatments render the surface paintable for only a few hours and are not as effective as the above indicated use of thiocyanogen.

The present invention is a method of treating the surface of a polymer which does not employ thiocyanogen, but is equally effective in modifying its surface to improve paint and/or ink adherence.

SUMMARY OF THE INVENTION

The surface of a polymer, e.g. polyurethane, is treated to improve the adherence of paint thereto by contacting its surface with a solution of ortho-benzoquinone or it substituted derivative and an organic carboxylic acid, its anhydride or cyanic or thiocyanic acid in an inert solvent.

DETAILED DESCRIPTION OF THE INVENTION

An ortho-benzoquinone or a substituted derivative thereof, e.g. tetrachloro-o-benzoquinone, referred to hereafter as ortho-chloranil, when employed in combination with an organic carboxylic acid or its anhydride, e.g. acetic acid, can be used to treat the surface of polymers, which normally are difficult to paint, to provide a more adherent surface for painting. The above combination is more easily applied if employed in an inert organic solvent, e.g. a chlorinated hydrocarbon.

Thus, polyurethane manufactured products can be treated by contacting their surfaces by immersion, spraying or brushing with a solution containing the composition. Such treatment provides a surface to which paint will adhere more readily. It is especially useful to treat the surface of molded polymer products in which an internal mold release, such as zinc stearate and/or silicones, has been employed, which makes the surfaces of molded items especially difficult to paint.

Solvents useful in applying the combination of the invention include chlorinated hydrocarbons having two to three carbon atoms such as methylchloroform, trichloroethylene, methylene chloride and carbon tetrachloride; fluorocarbons having one to three carbon atoms such as chlorotrifluoromethane (Freon 13), trichlorofluoromethane, chlorodifluoromethane (Freon 22), 1,1,2-trichloro-1,2,2-trifluoroethane (Freon 113), 1,2-dichloro-1,1,2,2-tetrafluoroethane (Freon 114); and hydrocarbons having from 6 to 10 carbon atoms such as hexane, cyclohexane, iso-octane and the like; esters such as ethyl acetate and ethers such as 1,4-dioxane and tetrahydrofuran. The surface of polymeric articles to which such treatment is applied is paintable up to about 15 days after the treatment.

Carboxylic acids useful in the composition are formic, acetic, propionic and butyric; equivalent to the carboxylic acids in the composition are cyanic and thiocyanic acids and anhydrides of the carboxylic acids such as acetic or propionic anhydrides.

Ortho-benzoquinones useful in the composition include o-benzoquinone, o-chloranil, tetrahydroxy-o-benzoquinone, tetrabromo-o-benzoquinone and tetramethyl-o-benzoquinone.

A solution of o-chloranil and acetic acid in an inert solvent has a shelf life of four months or more. Thus, it can be made up and stored for future use and does not need to be made immediately prior to use.

The ratio of the organic carboxylic acid to the ortho-benzoquinone compound in the composition ranges from about 1 to about 5 moles of acid per mole of o-benzoquinone compound in the solvent. The two components are present in toto in the solvent in an amount of from about 0.6 to about 1.1 percent based on the weight of total solution.

The polymer parts can be treated with the solution by spraying, immersing or brushing. The time for contacting the part with the solution is from about 10 to about 60 seconds, preferably from about 15 to about 20 seconds. To complete the treatment the part must be drained of excess liquid and/or the solvent is allowed to evaporate, usually with heating. While air drying at room temperature is satisfactory, time can be saved by heating which is generally accomplished in an oven maintained at a temperature of from about 80° to about 130° C., preferably from about 105° to about 120° C. The time necessary to dry the part will vary from about 10 to about 30 minutes, but preferably from about 10 to about 15 minutes depending on the temperature and solvent employed.

The treatment of polyurethane parts and parts made of similar polymers will not only make them more receptive to paints, but more adherent to glue for bonding the polymer to sheets of the same or other similar polymers which are difficult to adhere to one another. Also films of such polymers are made more receptive to inks for the printing of food packaging materials.

The following method was employed for measuring the contact angle, which is a measure of the wetting ability which correlates with the paintability of the polymer surface:

Procedure for Measuring Contact Angle

1. Place polymer specimen to be evaluated in a Kayeness, Inc. Contact Angle Viewer, Model D-1060.
2. Place a drop of an appropriate liquid on the specimen from a height of one inch.
3. Rotate the protractor so that the 90/90 vertical line is tangent to the arc at the leading edge of the drop. Read the contact angle at the arrow point.
4. Repeat 3 at the other edge of the drop.
5. Average the two readings.
6. Repeat steps 2, 3, 4 and 5, four times.
7. Average the four values to obtain the experimental contact angle.

The following examples are representative of composition and process of the invention:

EXAMPLE 1

Into a glass container was placed 300 mL of a stabilized methylchloroform to which was added 0.36 g of glacial acetic acid. This was stirred for 10 minutes and 1.48 g of o-chloranil was added and stirring was continued for 45 minutes. A piece ($\frac{1}{2}"\times\frac{1}{8}"\times 4"$) of reaction injection molded (RIM) polyurethane was then immersed in the solution at room temperature for 15 seconds. The molded polymer part was then removed, drained and placed in an oven at 110° C. for about 20 minutes. The part was then cooled to room temperature and painted with an automotive paint.

EXAMPLE 2

In the manner of Example 1, panels of polyurethane were treated by dipping into solutions containing 0.25 g (0.02M) o-chloranil and 0.12 g (0.04M) acetic acid in 50 mL of (1) ethyl acetate and of (2) 1,1,3-trichloro-1,2,2-trifluoroethane and of (3) water. An untreated panel (control) was also tested for comparison. The contact angle was measured according to the above procedure using Dowanol*EM as the contacting liquid. This measurement was repeated several times thereafter, each time employing the original control panel. The Table below shows the results immediately after treatment (A) and 16 days later (B):

TABLE

| Solvent | Contact Angle (°) | | | |
| --- | --- | --- | --- | --- |
| | Control (A) | Treated (A) | Control (B) | Treated (B) |
| (1) | 48 | 14 | 53 | 20 |
| (2) | 44 | 18 | 54 | 18 |
| (3) | 50 | 44 | — | — |

Note that the water is not a good solvent for the treating composition, whereas in solvents (1) and (2) the composition reduced the contact angle by 71 and 59 percent, respectively. After 16 days the reduction in contact angle remained high, being 62 and 66 percent, respectively for the same solvents.

All treated panels (using solvent 1 and 2) and similar panels, which had been treated with thiocyanogen and the stabilized thiocyanogen by immersing them in their solvent compositions, were painted with an automotive primer (PPG Primer HSP 9469). The appearance of the panels treated according to the present invention after painting was essentially the same as those which had been treated with thiocyanogen and the stabilized thiocyanogen compositions.

I claim:

1. A method for improving the adherence of paints, inks and glues to a polyurethane substrate by (a) contacting the surface of said polyurethane with a solution of an o-benzoquinone or its substituted derivative and an organic carboxylic acid, its anhydride, cyanic or thiocyanic acids in an inert organic solvent, (b) drying said surface and (c) subsequently applying paint, ink or glue to said surface.

2. The method of claim 1 wherein the contacting solution contains o-benzoquinone, tetrahydroxy-o-benzoquinone, tetrachloro-o-benzoquinone, tetrabromo-o-benzoquinone or tetramethyl-o-benzoquinone and an organic carboxylic acid.

3. The method of claim 2 wherein the organic carboxylic acid is formic, acetic, propionic or butyric.

4. The method of claim 3 wherein the carboxylic acid is in the form of its anhydride.

5. The method of claim 3 wherein the inert organic solvent is a liquid hydrocarbon or halogenated hydrocarbon.

6. The method of claim 5 wherein the liquid hydrocarbon is a compound having from 6 to 10 carbon atoms.

7. The method of claim 6 wherein the liquid hydrocarbon is hexane, cyclohexane or iso-octane.

8. The method of claim 5 wherein the liquid halogenated hydrocarbon is a chlorinated hydrocarbon.

9. The method of claim 8 wherein the chlorinated hydrocarbon is methylchloroform, trichloroethylene, methylene chloride or carbon tetrachloride.

10. The method of claim 6 wherein the liquid halogenated hydrocarbon is a fluorine-containing compound.

11. The method of claim 10 wherein the fluorine-containing compound is trichlorofluoromethane, chlorotrifluoromethane, chlorodifluoromethane, 1,1,2-trichlorotrifluoroethane or 1,2-dichloro-1,1,2,2-tetrafluoroethane.

* * * * *